United States Patent [19]

Meredith

[11] Patent Number: 6,006,113
[45] Date of Patent: *Dec. 21, 1999

[54] RADIO SIGNAL SCANNING AND TARGETING SYSTEM FOR USE IN LAND MOBILE RADIO BASE SITES

[75] Inventor: Sheldon Kent Meredith, Phoenix, Ariz.

[73] Assignee: Radio Frequency Systems, Inc., Marlboro, N.J.

[*] Notice: This patent is subject to a terminal disclaimer.

[21] Appl. No.: 08/708,130

[22] Filed: Jul. 26, 1996

Related U.S. Application Data

[63] Continuation of application No. 08/381,316, Jan. 31, 1995, abandoned, which is a continuation-in-part of application No. 08/348,045, Dec. 1, 1994, abandoned.

[51] Int. Cl.[6] .................................................. H04B 1/40
[52] U.S. Cl. ........................ 455/562; 455/102; 455/103; 455/132; 455/277.1
[58] Field of Search ................................... 455/562, 422, 455/436, 445, 524, 507, 272, 273, 275, 277.1, 25, 101–103, 132–134, 137, 129, 125, 136; 342/368, 378; 333/100, 101

[56] References Cited

U.S. PATENT DOCUMENTS

| | | | |
|---|---|---|---|
| 3,710,281 | 1/1973 | Thomas | 333/6 |
| 3,783,385 | 1/1974 | Dunn et al. | 325/305 |
| 3,964,065 | 6/1976 | Roberts et al. | 343/100 |
| 4,091,387 | 5/1978 | Profera | 343/754 |
| 4,163,974 | 8/1979 | Profera | 343/16 |
| 4,317,229 | 2/1982 | Craig et al. | 455/277 |
| 4,603,408 | 7/1986 | Singhal et al. | 367/92 |
| 4,647,868 | 3/1987 | Mueller | 330/286 |
| 4,694,484 | 9/1987 | Atkinson et al. | 379/59 |
| 4,704,734 | 11/1987 | Menich et al. | 455/33 |
| 4,728,956 | 3/1988 | Wallington | 342/371 |
| 4,761,822 | 8/1988 | Maile | 455/82 |
| 4,774,481 | 9/1988 | Edwards et al. | 333/127 |
| 4,785,267 | 11/1988 | Covill | 333/125 |
| 4,814,730 | 3/1989 | Via et al. | 333/119 |
| 4,835,496 | 5/1989 | Schellenburg et al. | 333/128 |

(List continued on next page.)

FOREIGN PATENT DOCUMENTS

| | | |
|---|---|---|
| 0352787 | 1/1990 | European Pat. Off. . |
| 0364190 | 4/1990 | European Pat. Off. . |
| 0593822 | 4/1994 | European Pat. Off. . |
| 0639035 | 2/1995 | European Pat. Off. . |
| 9107019 | 5/1991 | WIPO . |
| 9212590 | 6/1993 | WIPO . |
| 9623329 | 8/1996 | WIPO . |

OTHER PUBLICATIONS

"The Performance Enhancement of Multibeam Adaptive Base–Station Antennas for Cellular Land Mobile Radio Systems" Swales et al. IEE Transactions on Vehicular Technology, vol. 39, No. 1, Feb. 1990.

*Primary Examiner*—Lee Nguyen
*Attorney, Agent, or Firm*—Ware, Fressola, VanDer Sluys & Adolphson LLP

[57] ABSTRACT

A scanning and targeting system (100) interconnects a plurality of radio channel units (203) in a single trunk group with a plurality of antennas (202), each radio channel unit (203) having a receive section and a transmit section and the scanning and targeting system dynamically connecting the receive section of each one of the radio channel units with any one of the plurality of antennas which, on average during a sampling period, has the strongest received signal strength of RF signals at the operating frequency of the radio channel unit, and the scanning and targeting system dynamically interconnecting the transmit section of each of the plurality of radio channel units with any one of the plurality of antennas which, on average during the sampling period, is best suited for transmitting RF signals at the operating frequency of the radio channel unit in a direction corresponding to the desired destination for the transmitted RF signals.

24 Claims, 13 Drawing Sheets

U.S. PATENT DOCUMENTS

| | | | |
|---|---|---|---|
| 4,932,049 | 6/1990 | Lee | 379/60 |
| 5,032,804 | 7/1991 | Hollingsworth | 333/132 |
| 5,067,147 | 11/1991 | Lee | 379/60 |
| 5,070,304 | 12/1991 | Salib et al. | 330/54 |
| 5,111,166 | 5/1992 | Plonka et al. | 333/128 |
| 5,162,804 | 11/1992 | Uyeda | 342/373 |
| 5,175,878 | 12/1992 | Davis et al. | 455/103 |
| 5,187,447 | 2/1993 | Tsai | 330/124 |
| 5,193,109 | 3/1993 | Lee | 379/60 |
| 5,214,394 | 5/1993 | Wong | 330/286 |
| 5,222,246 | 6/1993 | Wolkstein | 455/13.4 |
| 5,243,598 | 9/1993 | Lee | 370/95.3 |
| 5,302,914 | 4/1994 | Arntz et al. | 330/129 |
| 5,303,240 | 4/1994 | Borrs et al. | 370/95.3 |
| 5,304,943 | 4/1994 | Koontz | 330/51 |
| 5,313,174 | 5/1994 | Edwards | 333/109 |
| 5,701,596 | 12/1997 | Meredith et al. | 455/103 |

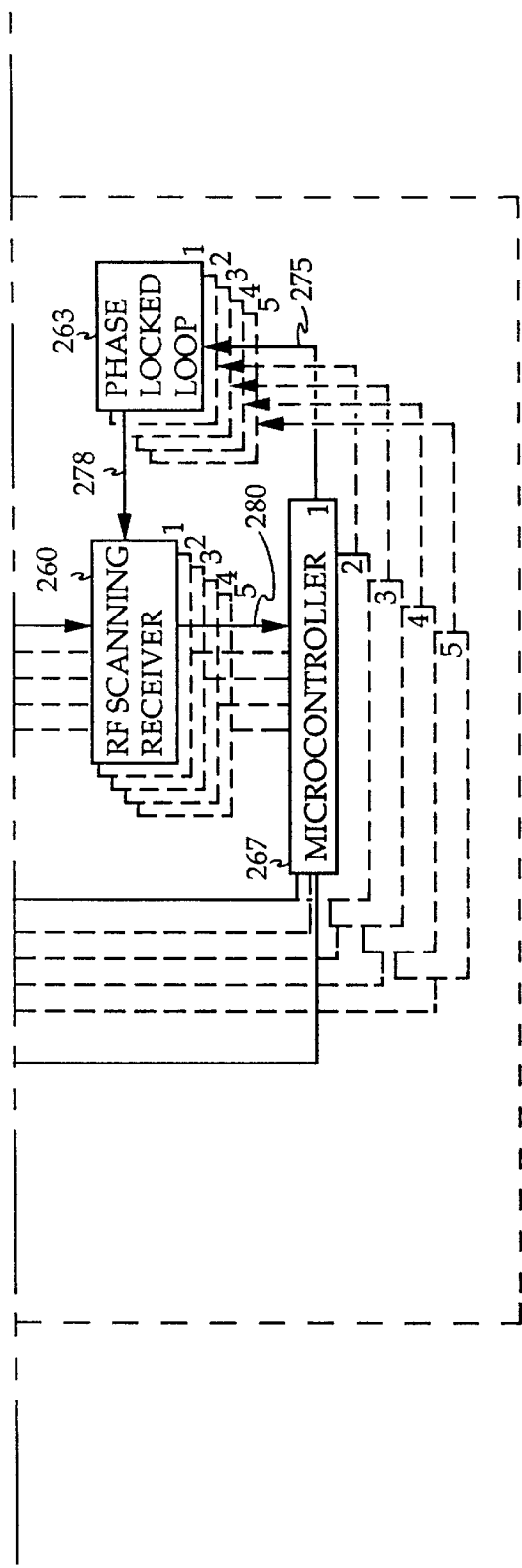
FIG. 2B
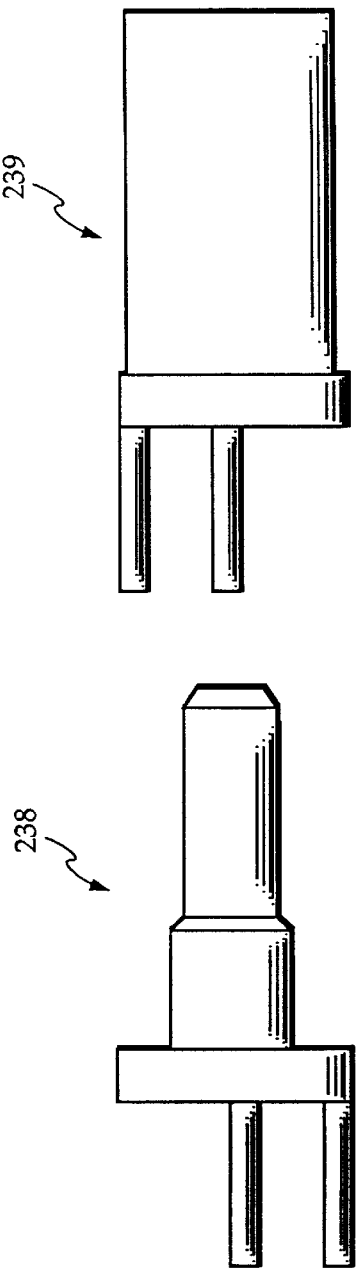
FIG. 8
FIG. 7
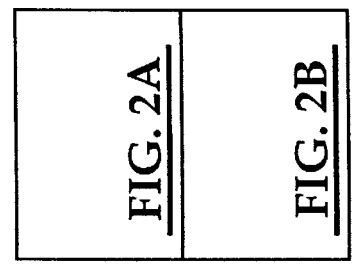
| FIG. 2A | |
|---|---|
| FIG. 2B | |
| FIG. 2 | |

RADIO SIGNAL SCANNING AND TARGETING SYSTEM FOR USE IN LAND MOBILE RADIO BASE SITES

"This application is a continuation of copending application(s) Ser. No. 08/381,316 filed on Jan. 31, 1995" which is a continuation in part of application Ser. No. 08/348,045 filed Dec. 1, 1994 now abandoned.

TECHNICAL FIELD

The present invention is directed an improved land mobile radio base site for a land mobile radio system, such as a mobile cellular telephone system, personal communications network (PCN), or other high frequency system, and more particularly, to a land mobile radio base site having reduced RF inte rference, and improved usage capacity and geographic coverage.

BACKGROUND OF THE INVENTION

In a typical land mobile radio system, such as a mobile cellular telephone system or personal communications network (PCN), a plurality of cells are defined which make up the system. Each cell is a geographically defined area wherein communications are handled by a land mobile radio base site (cell site) for mobile units operating within the boundaries of the cell. Although these cells are often represented as hexagons in cell design schemes, in reality, due to terrain and the presence of buildings and other structures, the actual boundary of a cell may have an irregular shape.

As is well known in the art, cell layouts are typically characterized by a frequency reuse pattern where a number of different frequency sets are defined. Each cell uses a particular frequency set, and the cell layout is designed to provide the maximum separation between cells using the same frequency set so as to minimize interference.

As a mobile unit travels along a path that passes from one cell to another, a handoff occurs from one cell site to another. The handoff action is controlled by a mobile telephone switching office (MTSO). A handoff command is typically generated when the signal received at a cell site from a mobile unit falls below a preselected signal strength thus indicating that the mobile unit is at a cell boundary. As the mobile unit passes from one cell to another, the MTSO instructs the cell which the mobile unit is entering to begin transmitting at a frequency which is different from the frequency which was being transmitted by the cell which the mobile unit is leaving. This procedure is repeated as the mobile unit travels from cell to cell.

A mobile unit typically contains a control unit, a transceiver, and an antenna system. Each cell site typically includes control means, a plurality of radio channel units (radios), a power plant, a data terminal, and antennas. The MTSO provides coordination for all of the cell sites and contains suitable processing and switching means. The communication links between the MTSO and the various cell sites are typically microwave, T carriers, or optical fiber, and carry both voice and control data between the cell sites and the MTSO. The MTSO that controls the cell sites also normally provides connectivity to nationwide telephone networks.

It is generally required, depending on the location of the cell site within a cell, that the cell site antennas provide coverage for communications over 360° of azimuth in order to effectively cover the corresponding geographic area. Typically, the 360° of azimuth is divided into a number of smaller sectors, and antennas having a directional beam are provided to service each sector, each antenna having a beamwidth corresponding to the azimuth of the sector. For example, if three sectors are defined, each sector is provided with a pair of antennas each having a beamwidth of 120°.

In the above described land mobile radio base site, each radio channel unit is a transceiver, having a transmit section and a receive section, able to transmit and receive RF signals, respectively. The transmit section of each radio channel unit is directly connected to one antenna within one of the sectors for the transmission of RF signals, and the receive section is directly connected to both antennas in the sector for the receipt of RF signals. All of the radio channel units connected to a particular pair of antennas within a sector are grouped together. For example, in a land mobile radio base site having 60 radio channel units and 3 pairs of antennas in three 120° sectors, the radio channel units are divided into three groups of 20, with all of the radio channel units within a group being connected to the same antenna pair. The group of radio channel units assigned to a pair of antenna is call a "trunk group".

When a mobile unit transmits a call request, the request is received by a cell site, and the cell site selects the best directive antenna for the voice channel to use. At the same time, the cell site sends a request to the MTSO via a high-speed data-link. The MTSO selects an appropriate voice channel for the call, and directs the cell site to act on the selection through the best directive antenna and one of the radio channel units in the antenna's trunk group. The MTSO also acts on the call request by making the appropriate connection with a telephone network.

When the mobile unit is traveling from one cell to another, a handoff occurs as described above. When the mobile unit is traveling within a cell, all of the antennas within the cell receive signal levels, but not necessarily the voice signals from the mobile unit. Only the antenna within the sector where the call was established (where the received signal level was the strongest) will transmit and receive signals to the mobile unit. When the mobile unit moves within the cell so that another sector receives the strongest signal, the system turns off the radio channel unit in the weaker sector and turns on a radio channel unit in the stronger sector such that the call is serviced by a new radio channel unit and antenna pair in a different sector within the cell. Typically, this change within a cell is handled solely by the base site control means, and the MTSO is not involved.

Usage capacity for a cell site is defined as the percentage of total available air time which can be statistically used over a given period of time. In the above described base site having 60 radio channel units, the total available air time during a one hour period is 60 units×60 minutes=3600 minutes, and the usage capacity is the percentage of that 3600 minutes which, statistically, can be used in a one hour period. The usage capacity will be less than 100% based on numerous factors, but most importantly based on the probability that all of the radio channel units in a given trunk group will be busy. A field of mathematics called "queuing theory" teaches that the usage capacity of a trunk group increases non-linearly with the number of radios in the trunk group. See, e.g., Bert et al., Data Networks 2nd Edition, pages 174–179. Therefore, it is desirable to avoid a large number of small trunk groups because they are relatively inefficient as compared to a smaller number of large trunk groups.

It is well known in the art that the transmission and reception of RF signals from a base site may be improved by using directional antenna having a narrow beamwidth, e.g., 30° as opposed to 120°. This improvement is due to a number of factors. A first important factor is a reduction in interference. Since energy is primarily transmitted in the known direction, i.e., the narrow beamwidth of the antenna, the base site produces much less RF interference for mobile units outside of the antenna's beam. Additionally, since the base site receives energy primarily from the direction of the mobile unit, the reception of undesired signals is greatly reduced. Therefore, increased directivety of an antenna allows interference reduction in both directions.

In addition to reduced interference, an improvement in geographic coverage is attained. Geographic coverage relates to the geographic area surrounding the base site wherein the magnitude of an RF signal transmitted from the base site and received by a mobile unit is strong enough to overcome the electrical noise present in the mobile unit's receiver by a predetermined amount. The amount is typically 17 dB, e.g., the signal received at the mobile unit from the base site must exceed the noise floor of the receiver by 17 dB. The directivety and gain of an antenna are related to its vertical and azimuthal beamwidths. For an omni-directional antenna, e.g., an antenna having a 360° beamwidth, the antenna gain can only be increased by narrowing its vertical beamwidth. Such omni-directional antennas have a typical maximum gain of around 10 to 12 dB relative to an isotropic (spherical) radiator. With sector antennas having beamwidths of between 90° and 120°, the achievable gains are around 15 dB with respect to an isotropic radiator. Using narrow beamwidth antenna, e.g., 15° to 30° beamwidths, gains of around 26 dB relative to an isotropic radiator are achievable. From the above it can be seen that narrow beamwidth antennas provide the significant advantage of improved geographical coverage with respect to antenna having a wider beamwidth.

In prior art systems, the advantages of using narrow beamwidth antennas must be balanced against the loss in usage capacity of using a large number of small trunk groups (associated with narrow beamwidth antennas). The present invention provides a solution to this problem by providing for the interconnection of any radio channel unit in a large trunk group with any beam of a plurality of antennas.

SUMMARY OF THE INVENTION

An object of the invention is a land mobile radio base site having a plurality of antennas and a plurality of radio channel units, wherein any one of the radio channel units may be interconnected with any one of the antennas in a single trunk group for the transmission and receipt of RF signals.

Another object of the present invention is to provide a land mobile radio base site scanning and targeting system for dynamically interconnecting a receive terminal of each one of a plurality of radio channel units with any one of a plurality of antennas which, on average during a sampling period, has the strongest received signal strength of RF signals at the operating frequency of the one radio channel unit.

A further object of the present invention is to provide a land mobile radio base site scanning and targeting system for dynamically interconnecting a transmit terminal of each one of a plurality of radio channel units with any one of a plurality of antennas which, on average during a sampling period, is best suited for transmitting RF signals at the operating frequency of the one radio channel unit in a direction corresponding to the desired destination for the transmitted RF signals.

A still further object of the present invention is to provide such a land mobile radio base site having improved usage capacity, improved geographic coverage and reduced RF signal interference.

A further object of the present invention is to provide such a land mobile radio base site which may be easily implemented with a modular interconnect matrix having a plurality of modules which may be quickly assembled for matrix connection of a plurality (N) of antennas with a plurality (M) of radio channel units.

According to the present invention, a scanning and targeting system interconnects a plurality of radio channel units in a single trunk group with a plurality of antennas, each radio channel unit having a receive section and a transmit section and the scanning and targeting system dynamically connecting the receive section of each one of the radio channel units with any one of the plurality of antennas which, on average during a sampling period, has the strongest received signal strength of RF signals at the operating frequency of the radio channel unit, and the scanning and targeting system dynamically interconnecting the transmit section of each of the plurality of radio channel units with any one of the plurality of antennas which, on average during the sampling period, is best suited for transmitting RF signals at the operating frequency of the radio channel unit in a direction corresponding to the desired destination for the transmitted RF signals.

In further accord with the present invention, the scanning and targeting system comprises a receive modular interconnect matrix for interconnecting the receive section of each one of the radio channel units with any one of the antennas for providing RF signals received by the antennas to the corresponding radio channel units, and a transmit modular interconnect matrix for interconnecting a transmit section of each one of the radio channel units with any one of the antennas for the transmission of RF signals.

In still further accord with the present invention, the receive modular interconnect matrix comprises first switching means for connecting each one of the antennas to a scanning receiver, each scanning receiver being associated with corresponding ones of the radio channel units; each one of the antennas being sequentially interconnected with each scanning receiver by said first switching means, and each scanning receiver providing output data signals to a microcontroller indicative of the received signal strength on each of the antennas at the operating frequencies of the corresponding ones of the radio channel units for determining the antenna having the strongest signal strength at the operating frequency of the corresponding ones of the radio channel units. The receive modular interconnect matrix further comprises a plurality of second switching means, each associated with one of the radio channel units, for interconnecting the radio channel units with at least one of the antennas, and the micro-controller providing control signals to the second switching means for connecting each radio channel unit with the antenna indicated as having the strongest signal strength at the operating frequency of the radio channel unit.

According further to the present invention, each radio channel unit has a diversity receiver capable of receiving signals from two antennas and determining the signal having the strongest signal strength, and the micro-controller provides control signals to the second switching means indicative of the two antennas having the strongest signal strength at the operating frequency for each of the associated radio channel units, and the second switching means interconnects the diversity receiver with the antenna having the strongest signal strength and the antenna having the second strongest signal strength.

According still further with the present invention, the transmit modular interconnect matrix comprises third switching means for interconnecting the transmit section with any one of the antennas, and the micro-controller controls each of the third switching means to interconnect the corresponding transmit section with the antenna indicated as having the strongest signal strength when a signal is received for the corresponding radio channel unit in the receive modular interconnect matrix.

The present invention provides a significant improvement over the prior art by providing a scanning and targeting system for interconnecting a plurality of radio channel units in a single trunk group with a plurality of antennas. Such systems allow for the use of a plurality of directional antenna at a land mobile radio base site for improved transmission and receipt of RF signals. Because a single trunk group is provided, the usage capacity of a cell site is increased by as much as 30% over prior art cell sites. Additionally, the use of directional antennas provides reduced RF interference and improved geographic coverage. The system may be implemented with modular components which are easily manufactured and tested, and therefore provide a simple and economical means of interconnecting radio channel units with antennas. The system of the invention is particularly well suited for use with multi-beam phase array antennas wherein each of the narrow beamwidth beams of a phase array antenna may be used for the transmission and receipt of RF signals. When such multi-beam phase array antennas are used, the particular beam chosen by the scanning and targeting system is the "antenna" referred to earlier for reception and/or transmission. Such phase array antennas use a phase array feed network, such as a Butler matrix feed network, to select the desired beam ("antenna").

The foregoing and other objects, features and advantages of the present invention will become more apparent in light of the following detailed description of exemplary embodiments thereof, in view of the accompanying drawings.

BRIEF DESCRIPTION OF THE DRAWINGS

FIG. 2 shows the relation between FIGS. 2A and 2B;

FIGS. 2A and 2B together are schematic block diagram of a receive modular interconnect matrix of the system of FIG. 1;

FIG. 7 is a side view of a coaxial quick-disconnect connector;

FIG. 8 is a side view of a coaxial quick-disconnect connector;

BEST MODE FOR CARRYING OUT THE INVENTION

Figure 1:
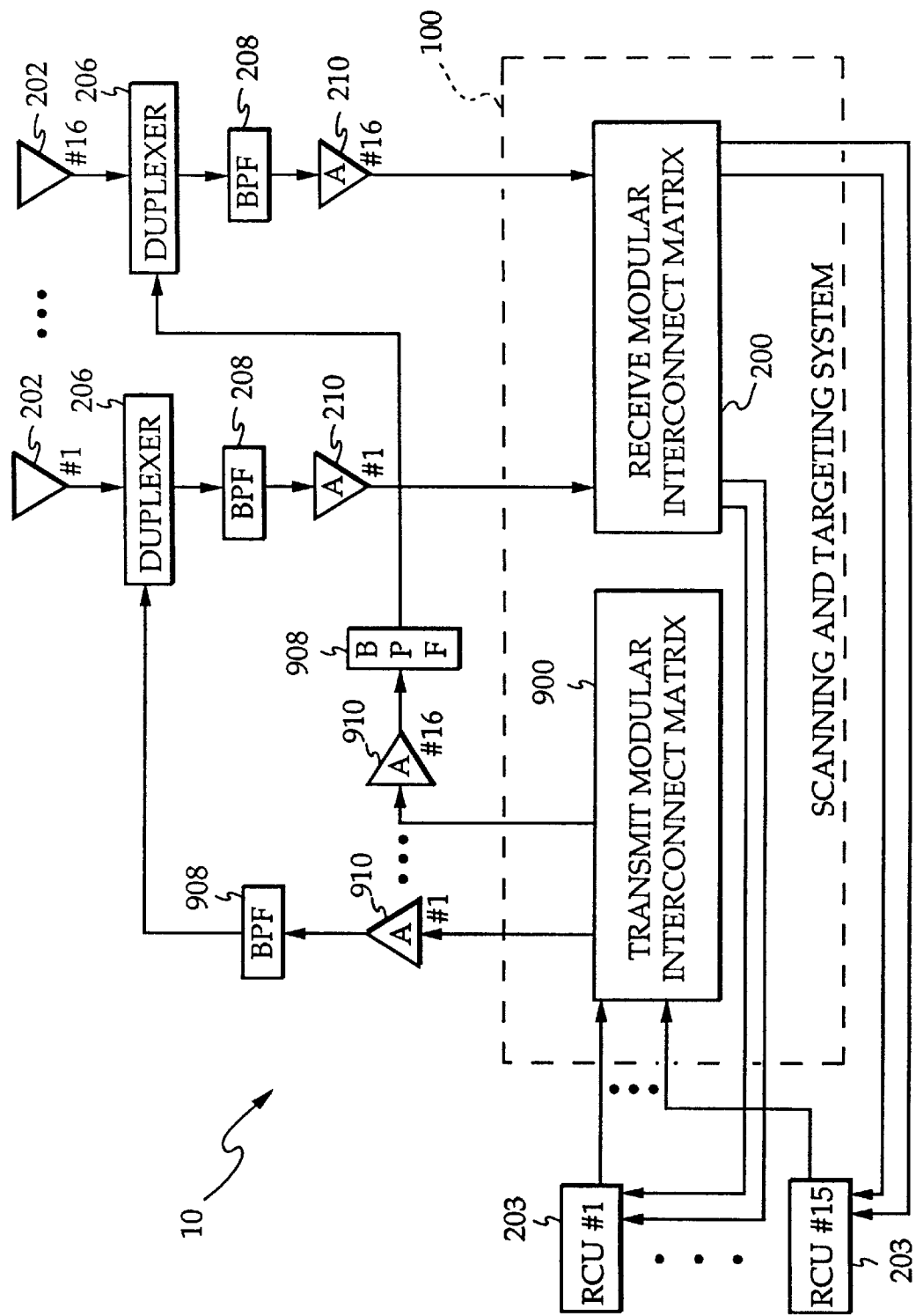
FIG. 1 is a schematic block diagram of a land mobile radio base site having the modular radio signal scanning and targeting system of the present invention.

Referring to FIG. 1, a land mobile radio system base site 10 includes a modular radio signal scanning and targeting system 100 of the present invention. The system 100 is used to dynamically interconnect a plurality (N) of antenna 202 with a plurality (M) of radio channel units 203. The radio channel units 203 are transceivers having a transmit section and a receive section. The receive section is typically a diversity receiver which is capable of receiving RF signal from two different sources and selecting the strongest of the two. The scanning and targeting system 100 of the invention dynamically connects the receive section of each one of the radio channel units 203 with any one of the antennas 202 which, on average during a sampling period, has the strongest received signal strength of RF signals at the operating frequency of the one radio channel unit 203. Additionally, the scanning and targeting system 100 dynamically connects the transmit section of each one of the plurality of radio channel units with any one of the plurality of antennas which, on average during a sampling period, is best suited for transmitting RF signals at the operating frequency of the one radio channel unit in a direction corresponding to the desired destination for the transmitted RF signals.

A first embodiment of the invention is described as being used with 16 different narrow-beamwidth antennas 202; however, it will be understood by those skilled in the art that a variety of different antenna configurations may be used with the invention. In particular, the antenna 202 may be a particular beam of a multi-beam phase array antenna system, wherein arrays of co-linear radiating elements form each phase array antenna, with the arrays driven by a phase array feed network, so as to generate a beam for the reception or transmission of radio frequency energy in a particular azimuthal direction.

The antennas 202 are used for the transmission and receipt of RF signals, and a duplexer 206 of a type known in the art is provided for each antenna 202, for controlling each antenna to either transmit or receive RF signal at any one time.

Figure 2A:
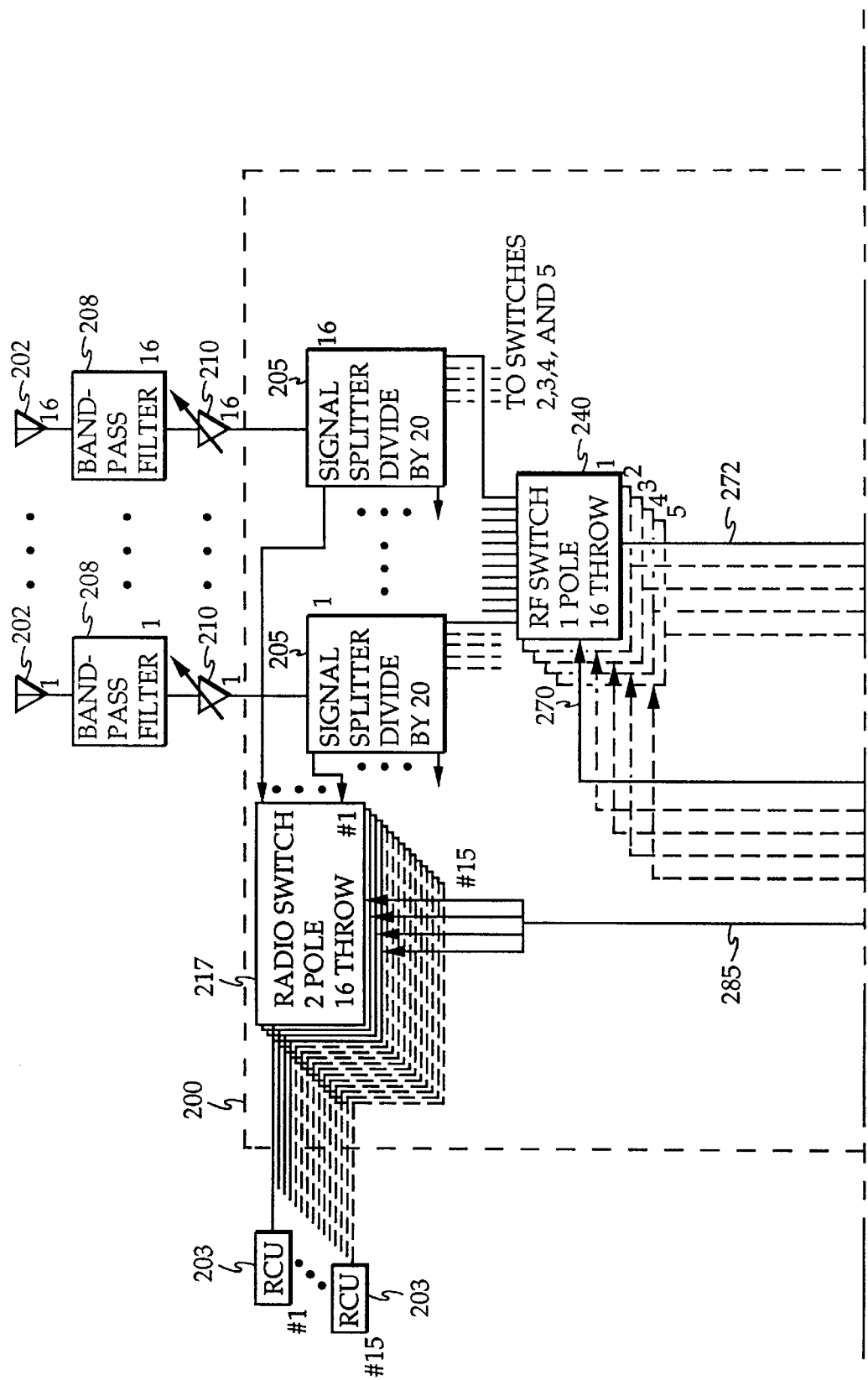
Figure 3:
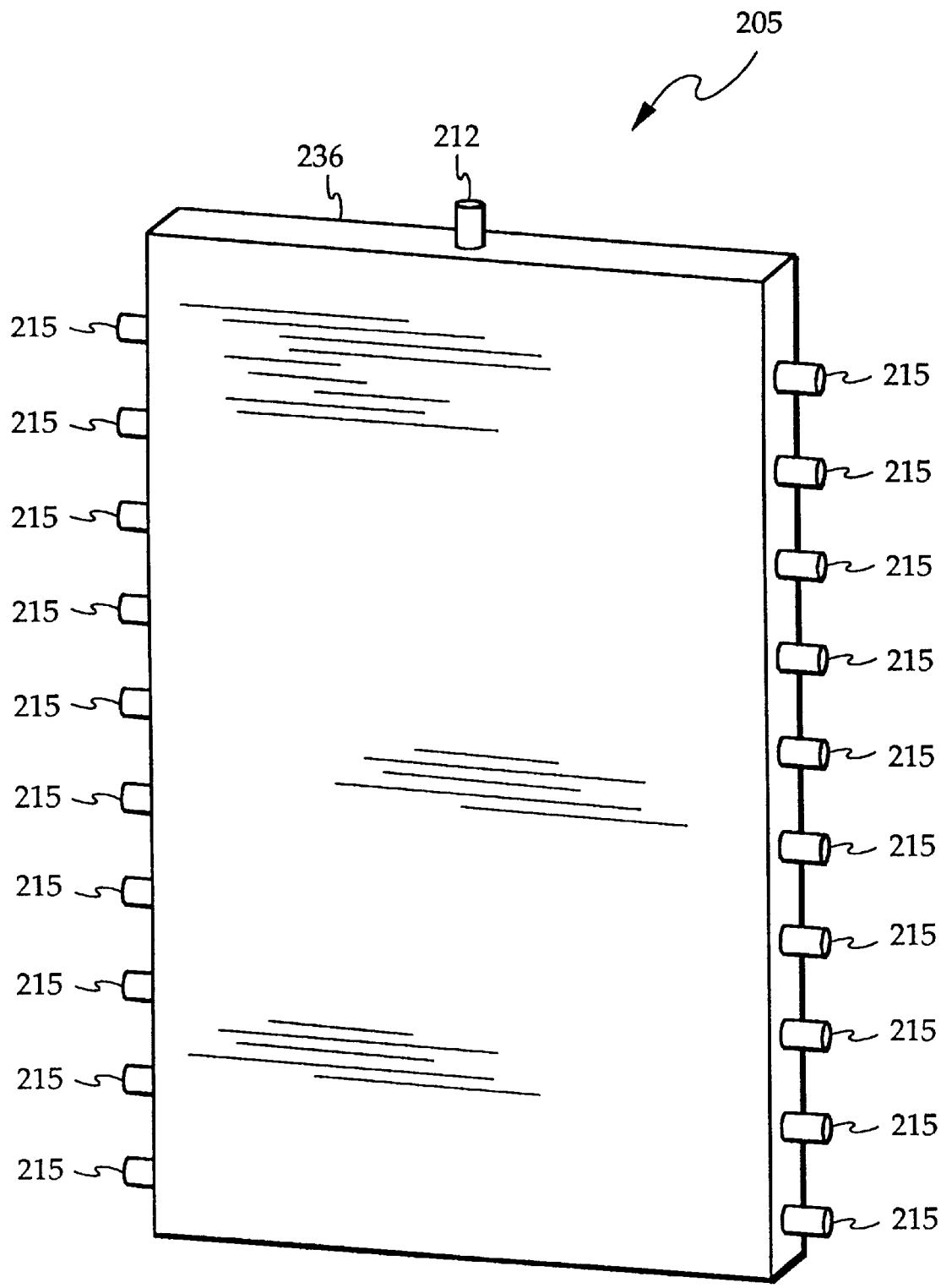
FIG. 3 is a perspective view of a splitter/combiner module of the receive modular interconnect matrix of FIGS. 2A and 2B.

Referring also to FIGS. 2A and 2B, the system 100 includes a receive modular interconnect matrix 200, i.e., a modular interconnect matrix which is used to provide signals received on antennas 202 to receive terminals mounted on the radio channel units 203. The receive modular interconnect matrix 200 comprises a plurality (N) of signal splitter modules 205, one signal splitter module 205 being associated with each of the antennas 202. Each antenna 202 is connected to its associated signal splitter modules 205 via a duplexes 206, a band pass filter 208, and an adjustable preamplifier 210 which amplifies the received signals before being provided to the signal splitters 205. In FIGS. 2A and 2B, sixteen (16) antennas 202 are shown interconnected to sixteen (16) signal splitter modules 205. The signal splitter modules 205 are power dividers which divide the amplified RF signals into a plurality (X) of equal parts, e.g., each of the equal parts has an identical signal characteristic (shape) as the amplified RF signal at a fraction (1/X) of the signal strength. For example, a 20-way power divider having a frequency range of 824 to 894 MHZ and an insertion loss of 16 dB may be selected for use as a signal splitter. In FIG. 3, each signal splitter module 205 is illustrated as dividing the received RF signal into 20 equal parts.

Referring also to FIG. 3, the signal splitter module 205 comprises an input connector 212 where the amplified signals provided by the antenna are input to the signal splitter module 205. The signal splitter module 205 also comprises a plurality (X) of output connectors 215 where the equal parts of the amplified RF signals are provided. FIG. 3 illustrates the signal splitter module 205 having 20 output connectors 215.

Figure 4:
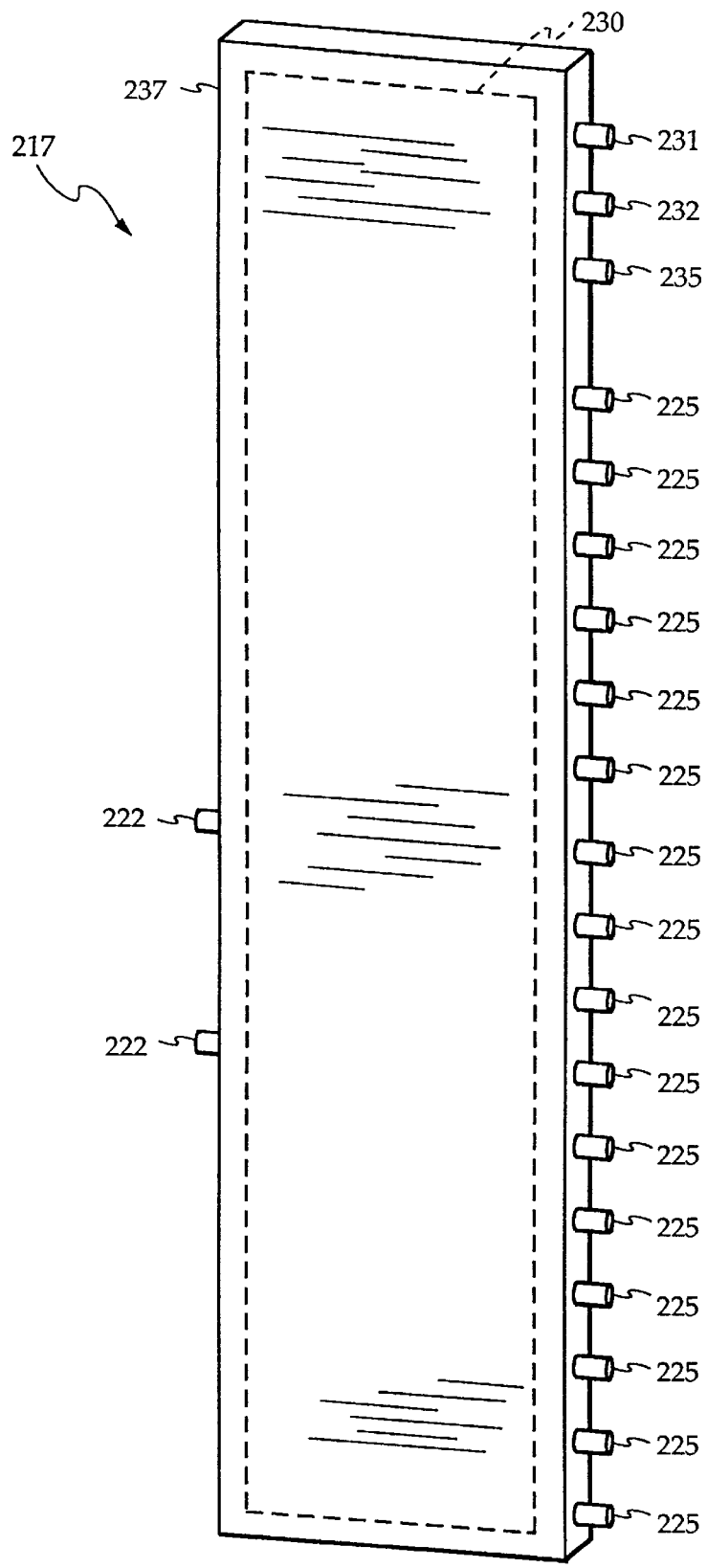
FIG. 4 is a perspective view of a first switching module of the receive modular interconnect matrix of FIGS. 2A and 2B.

Referring again to FIGS. 2A and 2B, the receive modular interconnect matrix 200 also comprises a plurality (M) of first switching modules (radio switching modules) 217. There is one first switching module 217 associated with each radio channel unit 203. Referring also to FIG. 4, each of the first switching modules 217 comprises a pair of first connectors 222 for interconnection with a pair of receiver connectors on the corresponding radio channel unit 203 (FIGS. 1, 2A and 2B). Each first switching module 217 also comprises a plurality (N) of second connectors 225. Each of the first connectors 222 and second connectors 225 are connected to an electronic switch 230 located within the first switching module 217. The electronic switch 230 is also connected to a ground connector 231, a power supply connector 232 and a control connector 235 mounted on the first switching module 217. The electronic switch 230 is a 2-pole-N-throw switch which operates under control of control signals provided to the control connector 235 for connecting each one of the first connectors 222 to one of the second connectors 225. The electronic switch 230 may be a two-pole-sixteen-throw electronic switch SW9481 manufactured by the Celwave Division of Radio Frequency Systems, Inc., which is powered by a 15 VDC power supply and is controlled by a pulse width modulated data stream containing both timing (clock) data and control (switching) data.

Referring now to FIGS. 2, 3, 4 and 6, the second connectors 215, 225 on both the signal splitter modules 205 and the first switching modules 217 are configured and arranged such that each one of the second connectors 225 on the first switching modules 217 may be interconnected to one second connector 215 on each signal splitter module 205. It will therefore be understood by those skilled in the art that using the above described arrangement, each one of the first switching modules 217 is provided with a portion (1/X) of the RF signal output of each antenna 202 due to the matrix interconnection of the first switching modules 217 with the signal splitter modules 205.

Referring to FIG. 3, to achieve the above described matrix interconnection of the first switching modules 217 (FIG. 4) with the signal splitter module 205, the signal splitter module 205 comprises a housing 236 which is generally rectangular in shape with the first connector 212 mounted at the center of one of the shorter (minor axis) sides of the rectangle. The second connectors 215 of the signal splitter module 205 are divided into two groups and are equally spaced on opposite long (major axis) sides of the rectangular shaped housing. Both the first connector 212 and the second connectors 215 on the signal splitter module 205 are male coaxial quick disconnect connectors 238 of the type illustrated in FIG. 7.

Referring to FIG. 4, the first switching module 217 also comprises a generally rectangular shaped housing 237. The first connectors 222 are evenly spaced about a central point of one long (major axis) side of the first switching module housing 237. The second connectors 225 are positioned on the other long (major axis) side of the housing 237 with the ground connector 231, the power connector 232 and the control connector 235. All of the connectors on the first switching module 217 are female coaxial quick disconnect connectors 239 of the type illustrated in FIG. 8.

The male and female coaxial quick disconnect connectors 238, 239 illustrated in FIGS. 7 and 8 may be selected from known connectors which are designed for interconnection with one another for providing a connection therebetween. The dimensions of the connectors are selected such that when the male and female connectors are interconnected, there is sufficient friction therebetween to provide a strong and secure connection without the requirement of threads or other interlocking means.

Figure 6:
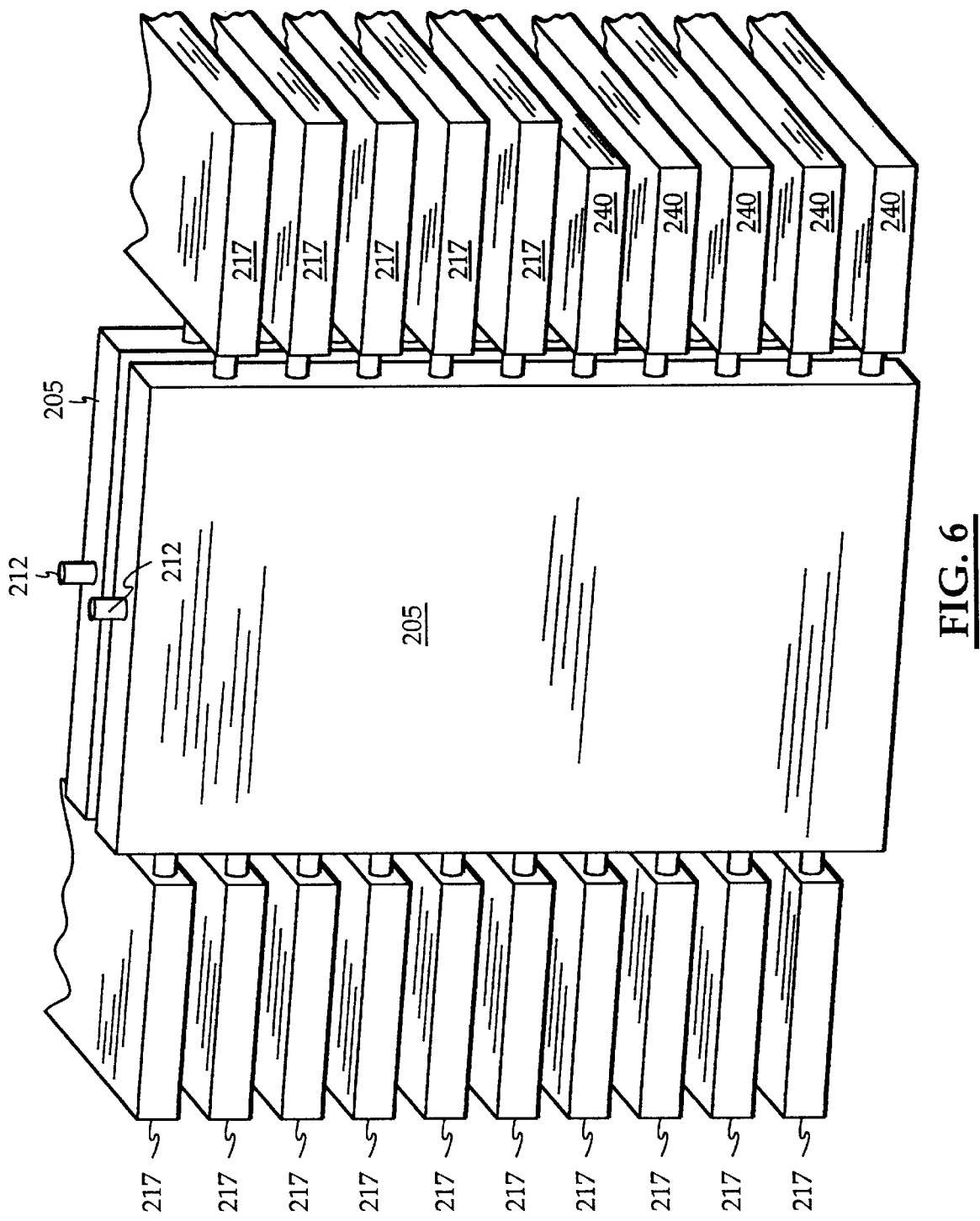
FIG. 6 is a perspective view of the receive modular interconnect matrix of FIGS. 2A and 2B.

Referring now to FIGS. 3, 4 and 6, the arrangement of the second connectors 225 on the first switching module 217 is selected such that when the signal splitter modules 205 are arranged adjacent to one another with the rows of second connectors 215 parallel to one another, the second connectors 226 of a first switching module 217 placed perpendicular to the parallel rows of second connectors 215 of the signal splitter module 205 will engage with one another.

Figure 5:
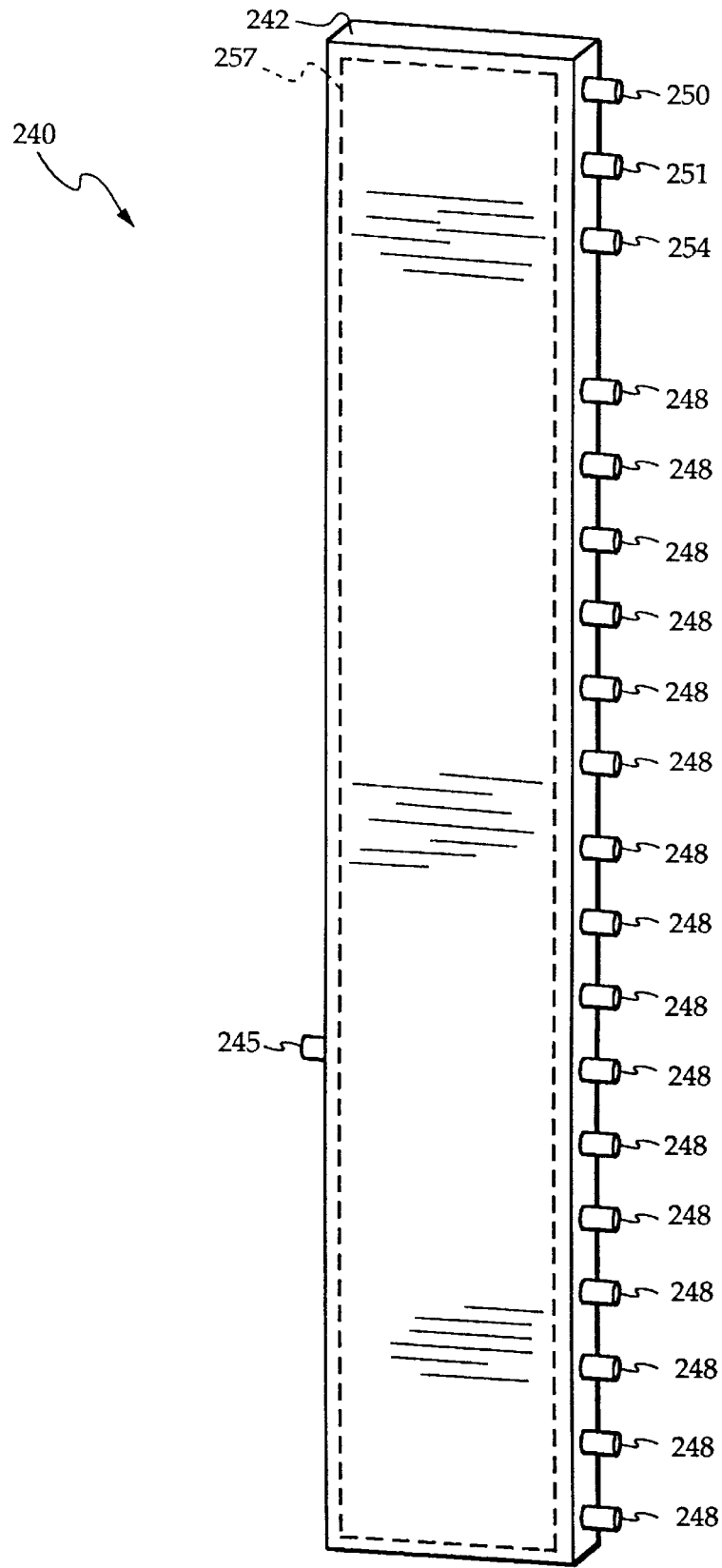
FIG. 5 is a perspective view of a second switching module of the receive modular interconnect matrix of FIGS. 2A and 2B.

Referring again to FIGS. 2A and 2B, a plurality (Y) of second switching modules 240 are also provided for interconnection with the signal splitter modules 205. Referring also to FIG. 5, the second switching module 240 comprises a generally rectangular shaped housing 242. Mounted on one of the long (major axis) sides of the housing 242 is a first connector 245, and mounted on the other long (major axis) side of the housing is a plurality (N) of second connectors 248, a ground connector 250, a power connector 251 and a control connector 254. Located within the second switching module housing 242 is an electronic switch 257 which is interconnected to all of the connectors 245, 248, 250, 251, 254 mounted on the second switching module 240. The electronic switch 257 is a one-pole-N-throw switch which interconnects the first connector 245 to any one of the second connectors 248 under control of control signals provided via the control connector 254. The electronic switch 257 may be a one-pole-sixteen-throw electronic switch SW9480 manufactured by the Celwave Division of Radio Frequency Systems, Inc., which is powered by a 15 VDC power supply and is controlled by a pulse width modulated data stream containing both timing (clock) data and control (switching) data.

Referring again to FIGS. 2A and 2B, the first connector 245 (FIG. 5) on each of the second switching modules 140 is connected to a corresponding RF scanning receiver 260. Associated with each RF scanning receiver 260 is a phase locked loop (PLL) device 263 and a micro-controller 267, e.g., a HC11F1 (PLL) manufactured by Motorola. As will be described in greater detail hereinafter, the micro-controller 267 controls the phase locked loop 263, which in turn controls the receiving frequency of the RF scanning receiver so as to sequentially receive RF signals at selected frequencies associated with certain ones of the radio channel units 203, and the micro-controller 267 also controls the second switching module 240 to sequentially interconnect each RF scanning receiver 260 with the antennas 202 via the splitters 205. The RF scanning receiver 260 then measures the received RF signal strength at the operating frequencies of the selected radio channel units 203, and provides an indication thereof to the micro-controller 267. The micro-controller 267 uses the signal strength information to determine the antennas having the strongest signal strength of received RF signals of the operating frequency of the selected radio channel units and then controls the first switching modules 217 of the selected radio channel units 203 to interconnect with the two antennas 202 having the strongest signal strength.

Referring again to FIGS. 3, 5 and 6, as with the first switching modules 217, all of the second connectors 248 on the second switching modules 240 are female coaxial quick disconnect connectors 239 of the type illustrated in FIG. 8. Additionally, as with the first switching modules 217, the second connectors 248 on the second switching module 240 are arranged such that when placed perpendicular to the rows of second connectors 215 on the signal splitter module 205, the second connectors 248, 215 interconnect with one another.

The operation of the receive modular interconnect matrix 200 is best understood by example. Referring to FIGS. 2A and 2B, fifteen (15) first switching modules 217 are provided for connection to fifteen (15) corresponding radio channel units 203. The radio channel units 203 and first switching modules 217 are divided into groups of equal numbers, and each group is associated with a corresponding second switching module 240, RF scanning receiver 260, micro-controller 267 and phase locked loop 263. In the example of FIGS. 2A and 2B, the first switching modules 217 and radio channel units 203 are divided into five groups of three. Therefore, there are five second switching modules 240, RF scanning receivers 260, phase locked loops 263 and micro-controllers 267.

There are 16 signal splitter modules 205, one being associated with each antenna 202. Each of the signal splitter modules 205 comprises twenty second connectors 215. On each of the signal splitter modules 205, fifteen of the second connectors are provided for interconnection with the fifteen first switching modules 217, and the remaining five second connectors 215 on the signal splitter module 205 are provided for interconnection with the five second switching modules 240. The interconnection of the signal splitter modules 205, first switching modules 217 and second switching modules 240 is illustrated in FIG. 6. The signal splitter modules 205 are arranged adjacent to each other with the two rows of second connectors 215 on each signal splitter module 205 arranged parallel to the rows of second connectors 215 on the other signal splitter modules 205. Ten of the first switching modules 217 are arranged adjacent to one another with their rows of second connectors 225 parallel to one another and perpendicular to the rows of second connectors 215 on the signal splitter modules 205. The male and female coaxial quick disconnect connectors 238, 239 (FIGS. 7 and 8) are then interconnected with one another such that at least one of the second connectors 225 on each of the ten first switching modules 217 is interconnected with at least one of the second connectors 215 on each of the sixteen signal splitter modules 205. The remaining five first switching modules 217 and the five second switching modules 240 are arranged in a like manner on an opposite side of the sixteen adjacent signal splitter modules 205.

Using the above described modular interconnect matrix, various relationships are established based on the following parameters:

N=the number of antennas.

M=the number of radio channel units.

Y=the number of groups the radio channel units are arranged in.

The relationships established by the above recited parameters include:

The number of signal splitter modules =N

The number of first switching modules =M

The number of second switching modules =Y

The number of second connectors on the first and second switching modules =N

The number of second connectors on the signal splitter modules =X=(M+Y)

Each micro-controller 267 controls a corresponding phase locked loop 263, second switching module 240 and three first switching modules 217 in each one of the five groups. Each radio channel unit 203 transmits and receives RF signals on an assigned (operating) frequency, and the phase locked loop 263 is configured to control the receiving frequency of the RF scanning receiver for sequentially receiving RF signals at three different frequencies, each of the three frequencies corresponding to the operating frequencies of the three radio channel units in its corresponding group. Under control of the micro-controller 267, the second switching module 240 selects one of the sixteen antennas 202. The signals provided by the antenna 202 are provided via the band pass filter 208 to the adjustable amplifier 210 where the received signals are amplified. Next the received signal is provided to the corresponding signal splitter module 205 where the signal is divided into 20 equal parts. One of the equal parts is provided to each of the second switching modules 240.

A control signal is provided on a line 270 from the micro-controller 267 to the control terminal 254 (FIG. 5) of the second switching module 240 for controlling the position of the one-pole-sixteen-throw switch 257 (FIG. 5) of the second switching module 240 for antenna selection. The part of the amplified RF signal from the selected antenna is provided via the first connector 245 (FIG. 5) of the second switching module 240 to a line 272 which is connected to the RF scanning receiver 260. The micro-controller also provides control signals on a line 275 to the phase locked loop 263 once an antenna has been selected to control the phase locked loop to in turn control the receiving frequency of RF scanning receiver 260 so as to sequentially receive RF signals at the three different frequencies corresponding to the three radio channel units within the corresponding group. Control signals are provided by the phase locked loop to the RF scanning receiver 260 on a line 278. First, the RF scanning receiver 260 measures the power level of the RF signal on the line 272 at the first frequency under control of the phase locked loop. The RF scanning receiver provides a signal on a line 280 to the micro-controller 267 indicative of the power level of the signal on the line 272 at the first frequency. The micro-controller 267 then provides a control signal on the line 275 to the phase locked loop 263, which in turn controls the RF scanning receiver 260 to receive RF signals at the second frequency. The RF scanning receiver then provides a second measurement of the power level of the received signal at the second excitation frequency on the line 280 to the micro-controller 267. This procedure is repeated for the third frequency.

After measurements are taken on one antenna at the three different excitation frequencies, the micro-controller provides a control signal on the line 270 to the second switching module 240 for selection of the next antenna 202. The signal provided by the next antenna 202 is then measured at the three excitation frequencies and these measurements are recorded by the micro-controller 267. This procedure is repeated for all sixteen antennas 202. Each antenna 202 is sampled at all three frequencies approximately 8 to 16 times per second, depending of the sampling speed as controlled by the micro-controller 267. The micro-controller 267 maintains a running average of the received signal strength at the three radio channel unit operating frequencies for all sixteen antennas, and provides a control signal on a line 285 to each of the first switching modules 217 in the corresponding group indicative of the two antennas having the strongest signal strength at the operating frequency of the corresponding radio channel unit. The electronic two-pole-16-throw switch 230 (FIG. 4) in the first switching module 217 connects two of the second connectors 225 (FIG. 4) to the two first connectors 222 (FIG. 4) in response to the control signal on the line 285 from the micro-controller 267. As is known in the art, the radio channel unit diversity amplifier then selects between the two input signals for providing an input to the receiver.

Figure 9:
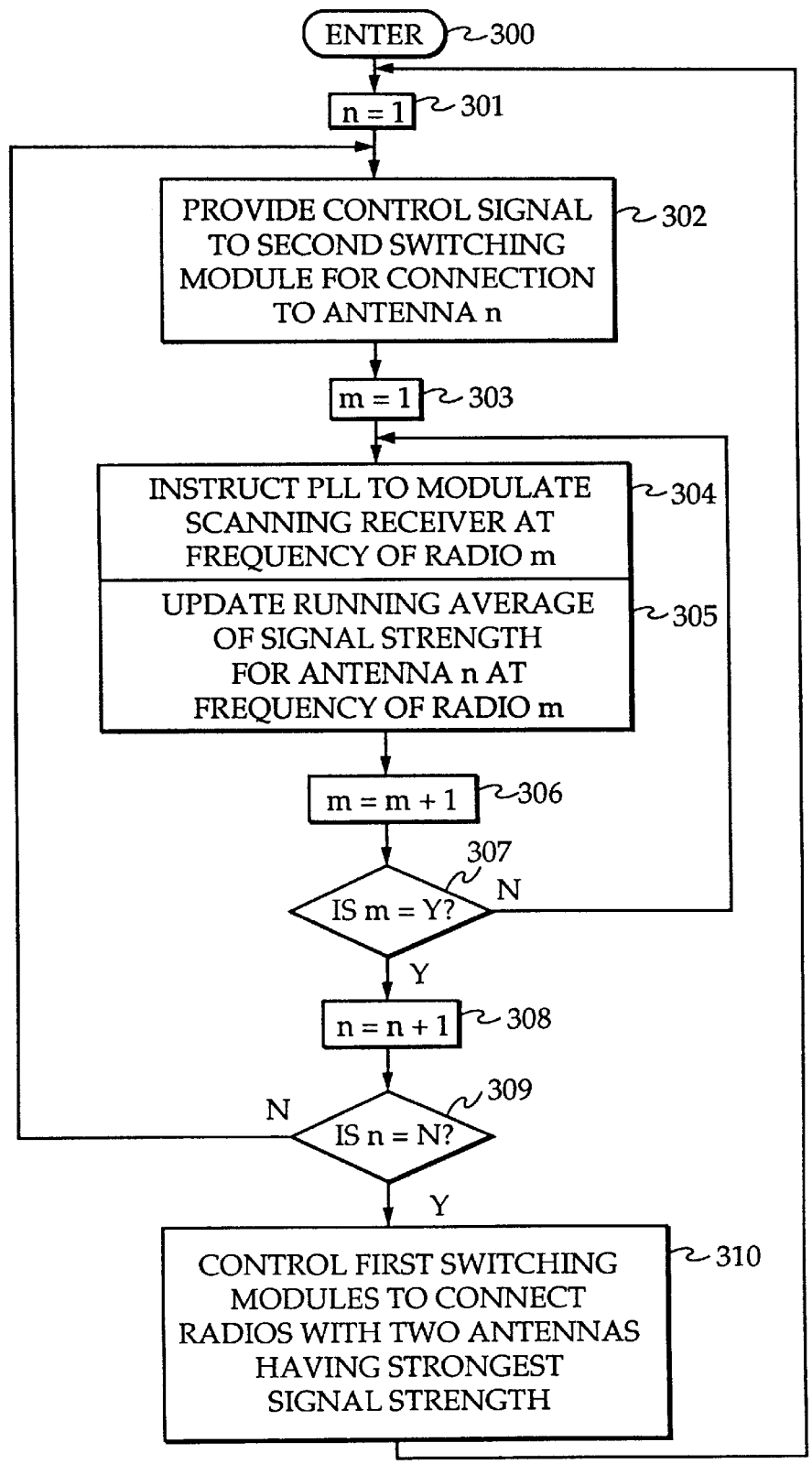
FIG. 9 is a logic flow diagram of a routine implemented by a microcontroller of the matrix of FIGS. 2A and 2B.

The microcontroller 267 may control the first and second switchin modules 217,240, the RF scanning receivers 260 and the phase locked loop (PLL) using the subroutine of FIG. 9. Referring to FIG. 9, the subroutine is entered in a step 300, and then a step 301 is performed wherein an antenna counter, n, is set equal to 1. Next, a step 302 is performed wherein the microcontroller 267 provides a control signal to the second switching module 240 for connecting the RF scanning receiver 260 to antenna n. The microcontroller 267 then performs a step 303 wherein a frequency counter, m, is set equal to 1. The microcontroller 267 then instructs the PLL 263 to modulate the scanning receiver 260 at a frequency corresponding to radio channel unit m in a step 304. Next, in step 305, the scanning receiver provides a measurement of received signal strength to the microcontroller, and the microcontroller updates the running average of signal strength for antenna n at the frequency of radio channel unit m. Step 306 is then performed wherein the frequency counter is incremented. The microcontroller then performs a test 307, wherein it checks if the frequency counter is equal to the number of radio channel units, Y, associated with the RF scanning receiver 260. If the results of the test 307 are negative, the subroutine returns to the step 304. However, if the results of the test 307 are positive, a step 308 is performed wherein the antenna counter is incremented. Next, a test 309 is performed wherein the microcontroller checks if the antenna counter is equal to the total number of antenna, N. If the results of the test 309 are negative, the subroutine returns to the step 302. However, if the results of the test 309 are positive, a step 310 is performed wherein the microcontroller 267 controls the first switching modules 217 to connect the radio channel units 203 with the two antenna 202 indicated as having the strongest signal strength of received RF signals at the operating frequency of the radio channel units 203. The subroutine then returns to the step 301.

Since the antennas 202 are narrow beamwidth directional antennas, the micro-controller controls the second switching module 240 to sample the antennas 202 so that adjacent antennas are not consecutively sampled, but rather, non-adjacent antennas are sampled consecutively. For example, if the antennas are sequentially numbered 1–16, the antennas may be sampled in the following order: 1, 4, 7, 10, 13, 16, 3, 6, 9, 12, 15, 2, 5, 8, 11, 14.

Figure 10:
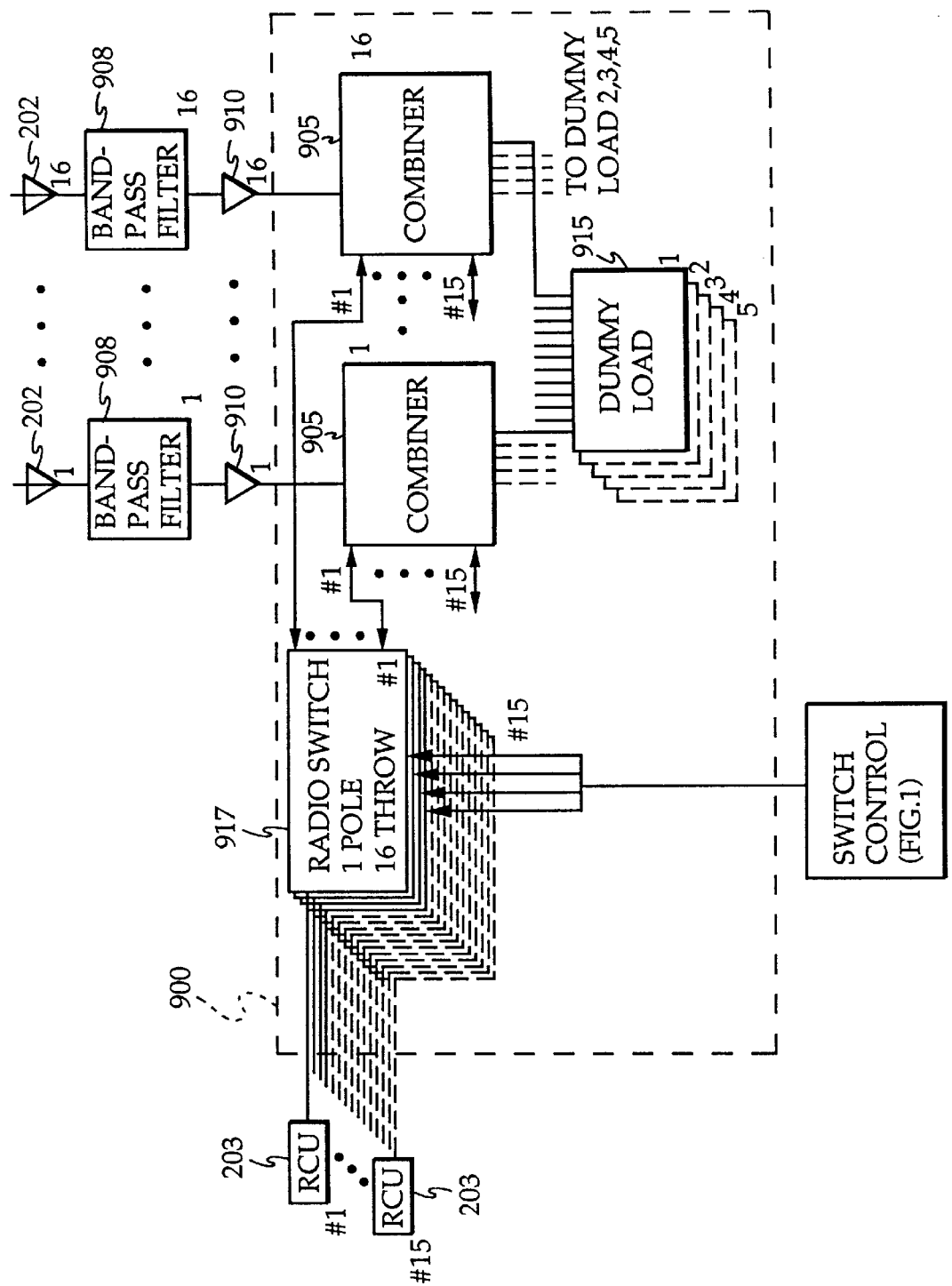
FIG. 10 is a schematic block diagram of a transmit modular interconnect matrix of the system of FIG. 1.

Referring again to FIG. 1, the system 100 also comprises a transmit modular interconnect matrix 900 used to interconnect a plurality of radio channel units 203 with a plurality of antennas 202 for the transmission of signals provided by the radio channel units 203 via the antennas 202. Referring also to FIG. 10, the transmit modular interconnect matrix 900 is similar to the receive modular interconnect matrix 200 except that the first switching module 917 is provided with one first connector for interconnection to a transmit terminal of a radio channel unit 203. Additionally, the signal splitter modules 205 (FIGS. 2A and 2B) are replaced with combiner modules 905 which combine RF signals provided to its plurality of second connectors into a combined RF signal which is provided from the first connector via an amplifier 910 and filter 908 to an antenna 202 for transmission. For purposes of controlling the transmit modular interconnect matrix 900, it is assumed that the antenna 202 indicated as having the strongest received signal strength at the operating frequency of the radio channel unit 203 is the best antenna for transmission of signals provided by the radio channel unit 203, and therefore, a second switching module and corresponding scanning receiver, phase locked loop, and micro-controller are not required in the transmit modular interconnect matrix 900. Instead, each first switching module of the transmit modular interconnect matrix 900 is controlled to interconnect its first connector with its second connector corresponding with the antenna having the strongest signal strength at the operating frequency of the corresponding radio channel unit. Additionally, since the five second switching modules are not required in the transmit modular interconnect matrix 900, the combiner modules 905 may be configured for connection with five dummy loads 915 mounted to the five second connectors which are not used. Alternatively, each combiner module 905 may be provided with only 15 second connectors for interconnection with the 15 first switching modules.

Figure 11:
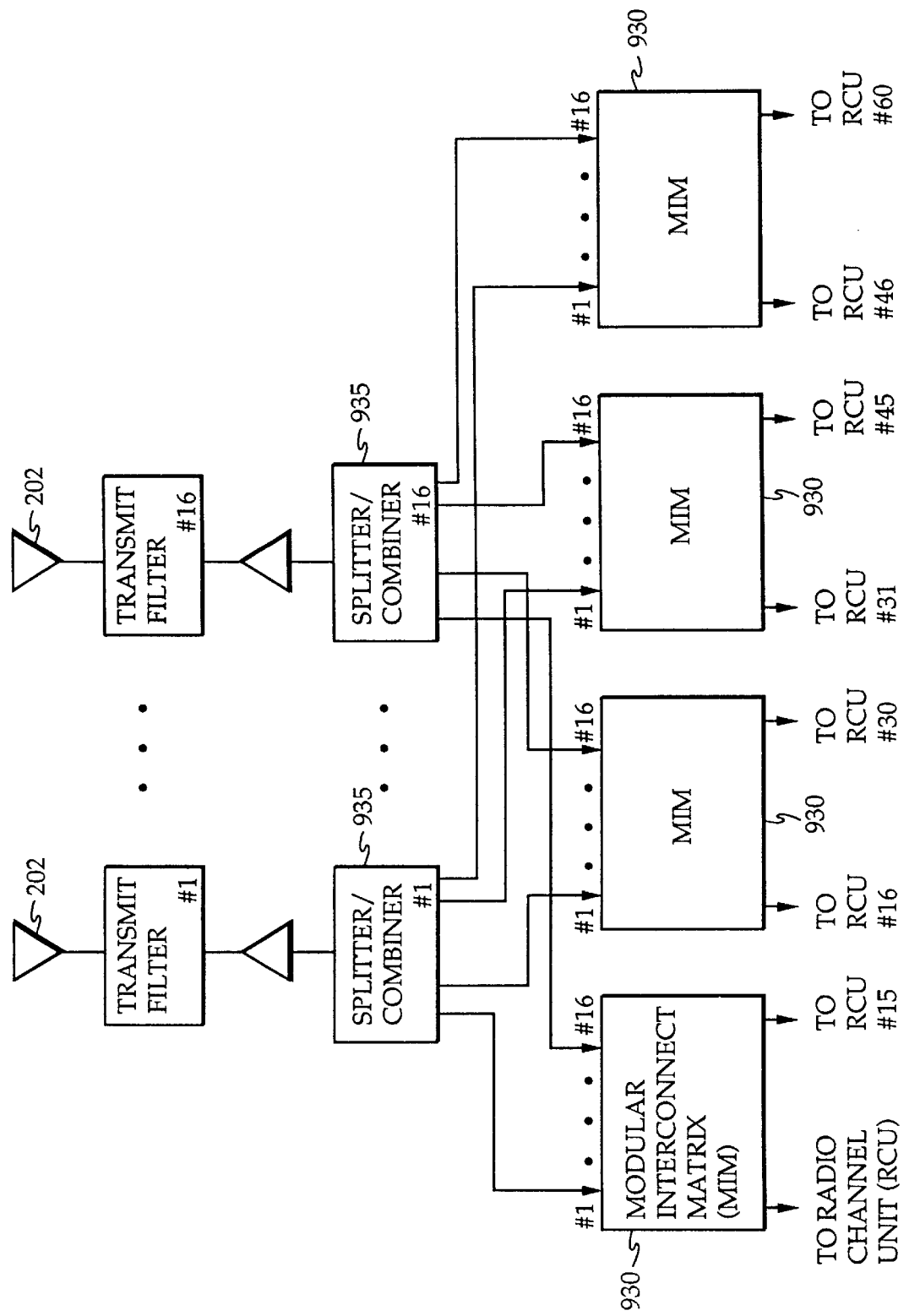
FIG. 11 is a schematic block diagram of a first alternative embodiment of the transmit modular interconnect matrix of FIG. 10.

The invention has been described thus far for interconnecting 15 radio channel units with the 16 antennas. If it is desired to increase the number of radio channel units or the number of antennas, the modular components may be modified accordingly. Alternatively, a plurality of modular interconnect matrices may be provided to increase the number of radio channel units. For example, referring to FIG. 11, four transmit modular interconnect matrices 900 may be provided, each for interconnection to 15 radio channel units and sixteen antennas 202. Each of the modular interconnect matrices 930 may be connected to the antennas 202 via a second combiner or splitter 935 for achieving the desired total number of radio channel units and antennas. As shown in FIG. 11, there are four transmit modular interconnect matrices 900 each having 15 radio channel units for a total of 60 radio channel units interconnected to 16 antennas.

As can be seen from the above description of the modular radio signal scanning and targeting system 100 of the present invention, all of the radio channel units 203 at a base site 10 act as a single trunk group because any radio channel unit 203 is interconnectible to any antenna 202 at any time. Therefore, a significant improvement in usage capacity is provided by the present invention in comparison to the prior art. For example, using a single trunk group of 60 radio channel units with the system of the present invention as opposed to three trunk groups each having 20 radio channel units, as is known in the prior art, the usage capacity of the base site is increased by approximately 30%. The present invention also provides the significant advantage over the prior art of using narrow beamwidth directional antennas as opposed to the wider beamwidth antennas used in the prior art. As is well known in the art, for a given power level (signal strength), use of the narrow beamwidth antennas provide a significant reduction in interference for both the transmission and receipt of RF signals, as described above, thereby greatly improving the quality of signal transmissions.

The invention has been primarily described thus far as using 16 different antenna for the transmission and receipt of RF signals. These antenna are described as having a narrow beamwidth so as to achieve the known benefits of improved signal transmission quality as described above. However, the 16 antenna can be thought of as 16 separate signal ports for interconnection with 16 different means for transmitting and receiving RF signals. For example, as an alternative to 16 physically separate antennas, the present invention may be used with multi-beam, phase-array antennas whereby each antenna comprises a radiation pattern having a plurality of narrow beams or main lobes, each of which acts as a separate signal port for the transmission and receipt of RF signals.

Figure 12:
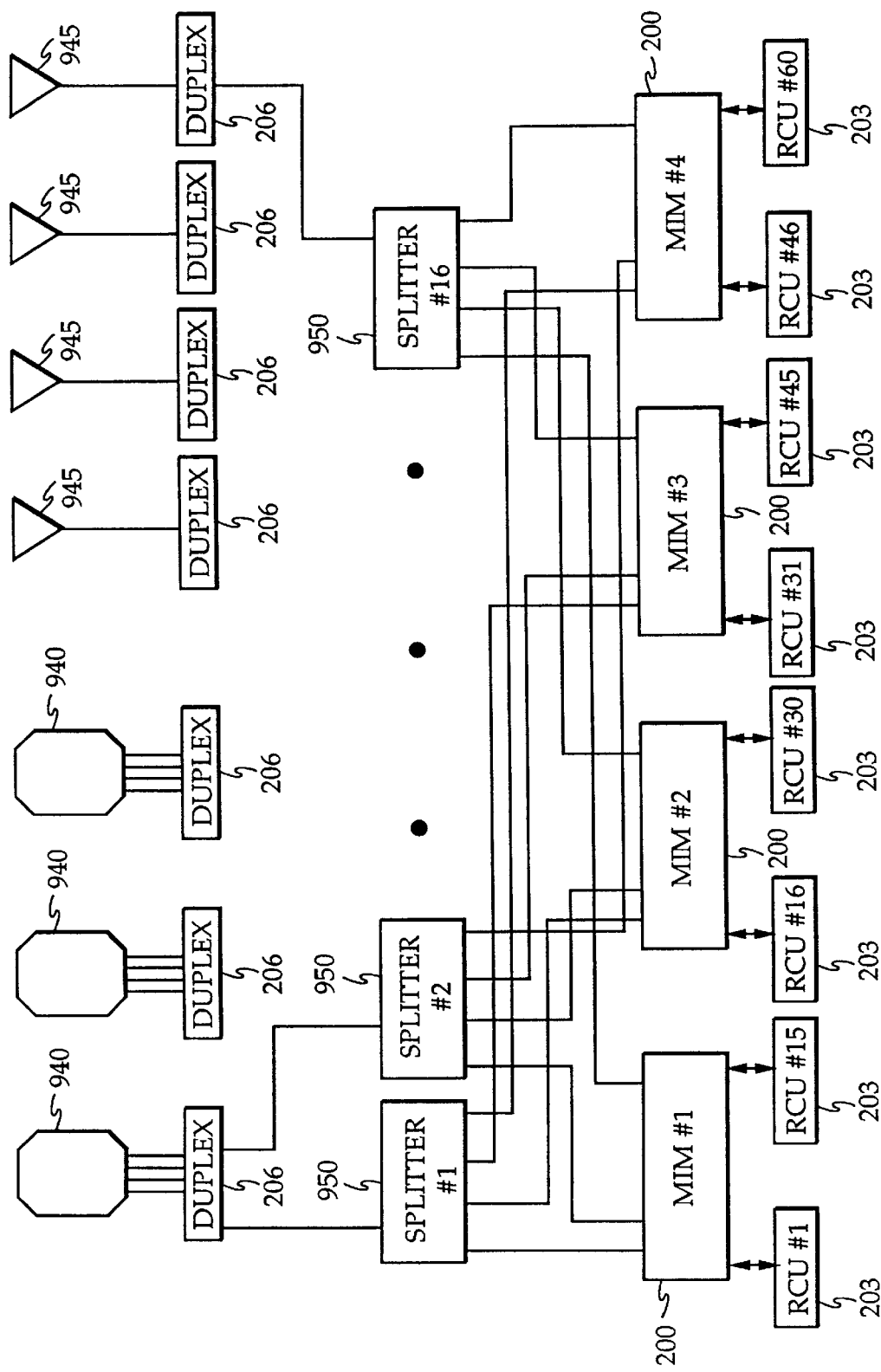
FIG. 12 is a schematic block diagram of a first alternative embodiment of the receive modular interconnect matrix of FIGS. 2A and 2B.

Referring to FIG. 12, the present invention may be used with three multi-beam antennas 940 (which may be space tapered) of the type described in commonly owned co-pending U.S. patent application Ser. No. 08/365,590 filed Dec. 28, 1994 for an Improved Antenna System with Tapered Aperture Antenna and Microstrip Phase Shifting Feed Network, by Sheldon K. Meredith et al., the disclosure of which is incorporated herein by reference, particularly FIGS. 3, 4, 6, 7, 9 and 10 and the accompanying description. In the present example, three such antennas 940 may be used, each having 4–30° beamwidth beams, and arranged such that the entire 360° azimuth is covered. The 12 beams of the three antennas may be interconnected to 12 of the signal ports, and four additional antennas 945 may be used with the remaining four ports for a total of 16. Depending on the terrain and building structures in the area of the cell site, it may be desirable to provide as one of the 4 additional antennas 945 an omni-directional antenna, or wide-beam antenna, at a location remote from the three multi-beam phase-array antennas, in an area where interference is likely. Additionally, antennas 945 may be placed at other remote locations such as parking garages, sports stadiums, tunnels or other obstructed areas in the cell for servicing mobile units in such areas. Such remote antennas 945 may be connected to the cell site via fiber optic lines, microwave, millimeter waves, etc. A configuration of this type provides the system designer with several options as to the optimal placement and usage of antennas.

In the example of FIG. 12, the 16 antennas are shown as being interconnected to 60 radio channel units via 4 receive modular interconnect matrices 200. The signal provided by each antenna 940,945 is provided to a splitter 950 which divides the output of each antenna 940,945 into four equal power parts. Although not shown, it will be understood by those skilled in the art that the output of each antenna 940,945 is amplified and filtered as necessary to provide the proper signal level to the radio channel units. As can be seen from FIG. 12, the present invention allows the interconnection of any one of the 16 antennas to any one of the 60 radio channel units. Therefore, each radio channel unit is dynamically interconnected to the two radio channel units having the strongest signal strength of received RF signals at the operating frequency of the radio channel unit. In effect, one large trunk group is created by the system of the present invention.

Figure 13:
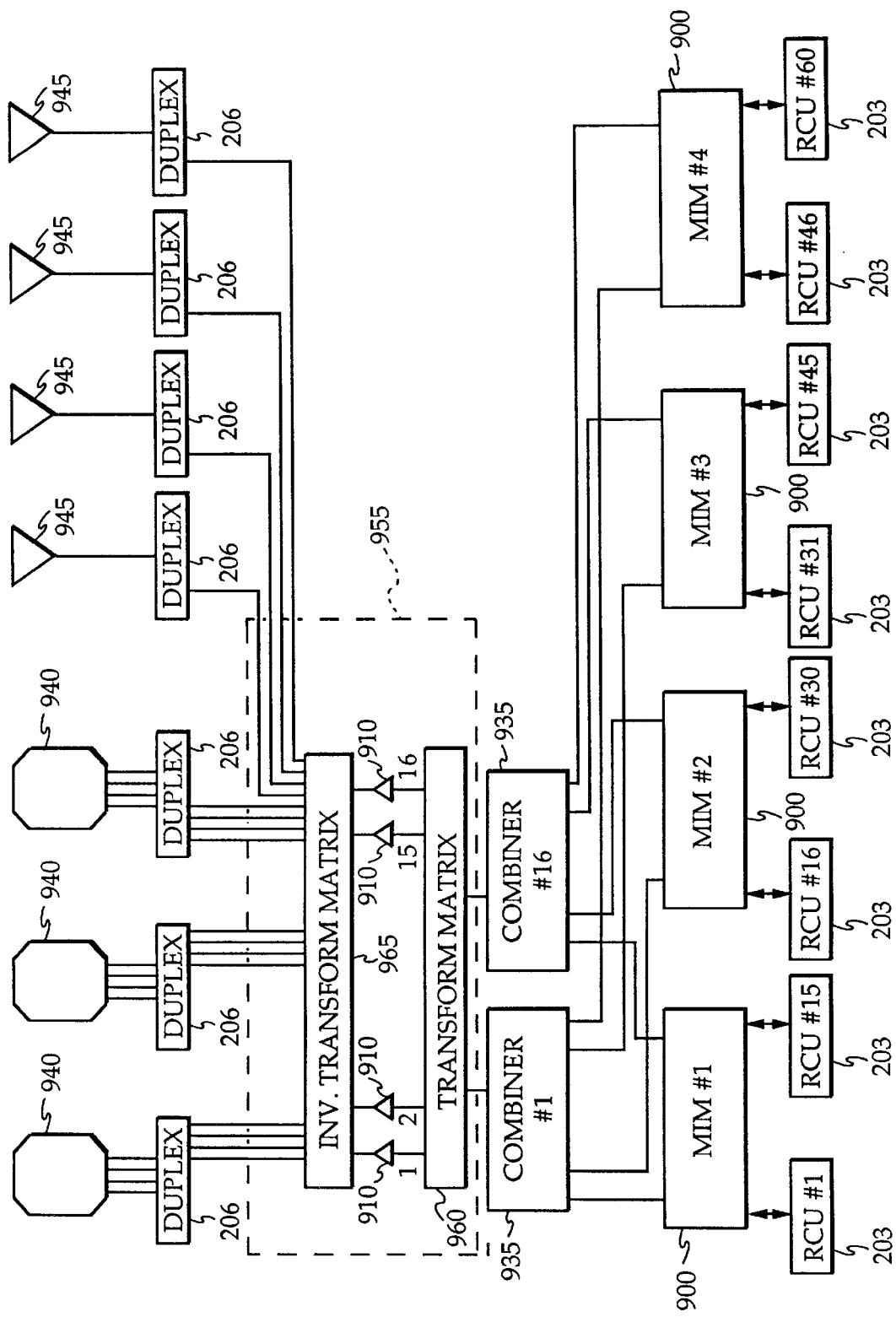
FIG. 13 is a schematic block diagram of a second alternative embodiment of the transmit modular interconnect matrix of FIG. 10.

Referring to FIG. 13, for improved transmission of RF signals, it may be desirable to provide a power sharing system 955 of the type described in commonly owned, copending U.S. patent application Ser. No. 08/314,898 filed on Sep. 29, 1994 for a Power Sharing System for High Power RF Amplifiers, by Sheldon K. Meredith, the disclosure of which is incorporated herein by reference. Using such a system, improved signal quality of transmitted RF signals is achieved while power consumption is reduced. The system of FIG. 13 is similar to the system shown in FIG. 11, with the exception that the output of each of the 16 combiners 935 is provided to a fast-Fourier transform matrix 960 which spreads the output of each of the 16 combiners 935, and therefore the output of the 60 radio channel units 203, evenly between the 16 amplifiers 910. The outputs of the amplifiers 910 are provided to an inverse fast-Fourier transform matrix 965 which recombines the signals, thereby providing an amplified version of the splitter outputs at its output.

Figure 14:
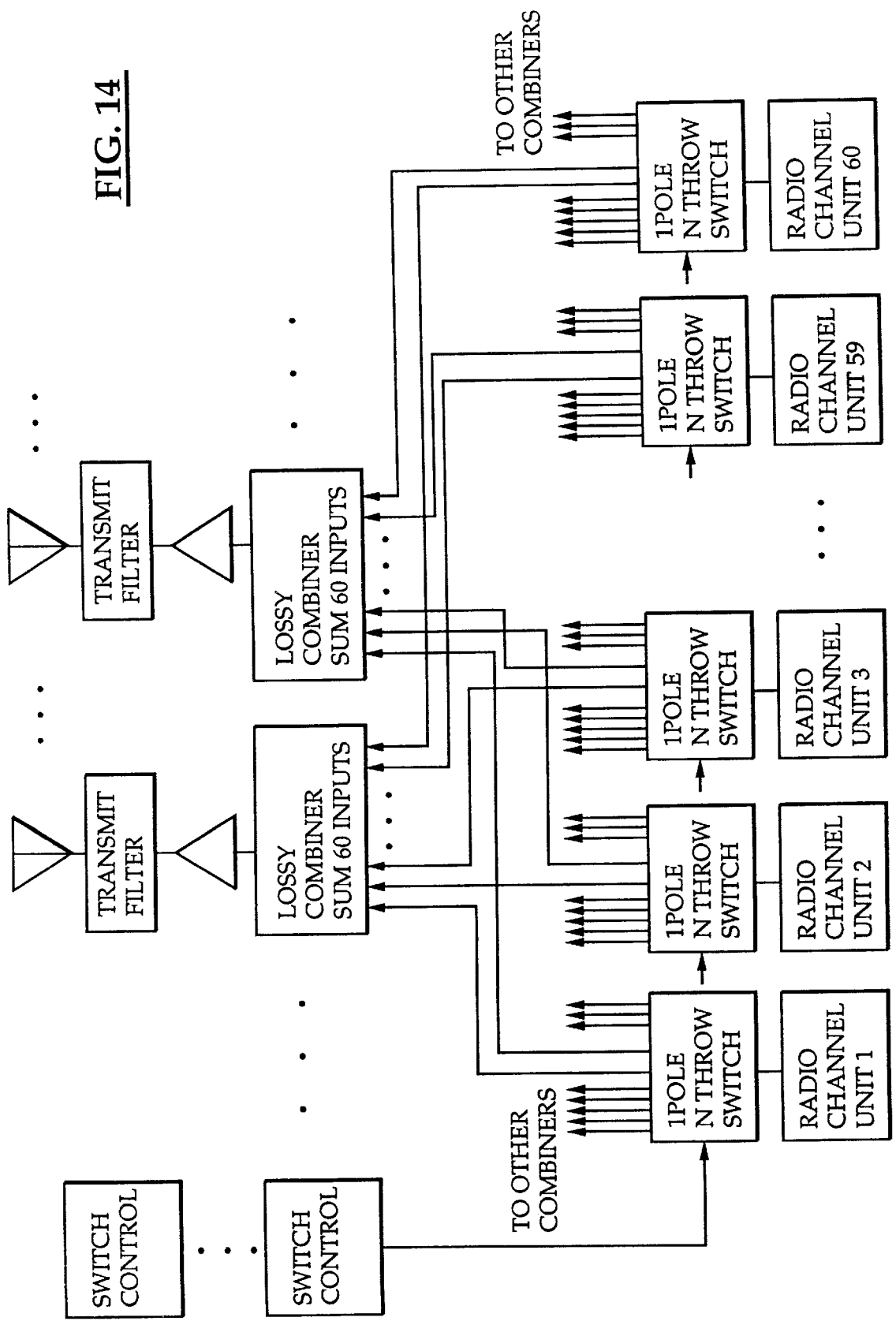
FIG. 14 is a schematic block diagram of a third alternative embodiment of the transmit modular interconnect matrix of FIG. 10.

The invention has been described herein as using modules which directly interconnect with one another for providing the matrix connection of any one of a plurality of antennas with any one of a plurality of radio channel units. However, in another embodiment of the invention, rather than providing interconnecting modules for creating the matrix, the components of the matrix connection may be interconnected with known coaxial cables. An example of such a matrix connection (transmit modular interconnect matrix) using coaxial cables is schematically illustrated in FIG. 14. In a RF signal transmit interconnection having 60 switches associated with 60 radio channel units with 16 antennas via 16 combiners, 960 coaxial cables are required between the combiners and the switches. similarly, 960 coaxial cables are required between 60 switches and 16 splitters for RF signals received by the 16 antennas. Although this embodiment provides the desired matrix connection of the radio channel units and the antennas, the physical mass of cabling and the cost of connectors, cable, and cable assembly and inspection is significant.

Although the invention has been described herein with respect to exemplary embodiments thereof, it will be understood by those skilled in the art that the foregoing and various other changes, omissions and additions may be made therein and thereto without department from the spirit and scope of the present invention.

What is claimed is:

1. A scanning and targeting system for interconnecting a plurality of radio channel units in a single trunk group with a plurality of antenna beams, each radio channel unit having a receive section and a transmit section, said scanning and targeting system comprising:

receiving means for dynamically connecting the receive section of each one of the radio channel units with any one of the plurality of antenna beams which, on average during a sampling period, has the strongest received signal strength of RF signals at an operating frequency of the one radio channel unit, said receive means including:

a plurality of frequency controllable receiver means, each associated with a corresponding group of radio channel units;

first switching means for selectively connecting each one of the antenna beams to each one of said frequency controllable receiver means; and control means for controlling said first switching means to selectively interconnect each one of the antenna beams with each one of said frequency controllable receiver means and for controlling said frequency controllable receiver means to provide signal strength measurements of RF signals received at the operating frequencies of the radio channel units in said corresponding group; and transmit means for dynamically connecting the transmit section of each one of the radio channel units with any one of the plurality of antenna beams which, on average during said sampling period, is best suited for transmitting RF signals at the operating frequency of the one radio channel unit in a direction corresponding to a desired destination for the transmitted RF signals.

2. A scanning and targeting system according to claim 1, wherein said receiving means further comprises second switching means for connecting the receive section of each one of the radio channel units with any one of the antenna beams, and wherein said control means controls said second switching means to connect the receive section of one of the radio channel units with the antenna beam indicated as having the strongest signal strength of RF signals received at the operating frequency of the one radio channel unit.

3. A scanning and targeting system according to claim 2, wherein said transmit means comprises third switching means for connecting the transmit section of each one of the radio channel units with any one of the antenna beams, and wherein said control means controls said third switching means to connect the transmit section of one of the radio channel units with the antenna beam indicated as having the strongest signal strength of RF signals received at the operating frequency of the one radio channel unit.

4. A scanning and targeting system according to claim 3, wherein said plurality of frequency controllable receiver means includes:

a plurality of scanning receivers, each associated with a corresponding group of radio channel units; and a plurality of phase lock loops, each associated with one of said scanning receivers; and wherein said control means controls said phase lock loops to modulate said scanning receivers at the operating frequency of radio channel units in said corresponding group, and wherein said scanning receivers provide said control means with signal strength measurements of RF signals received at the operating frequencies of the radio channel units in said corresponding group.

5. A scanning and targeting system according to claim 2, wherein each radio channel unit has a diversity receive capable of receiving signals from two antenna beams and determining the signal having the strongest signal strength, and wherein said control means controls said second switching means to dynamically connect the receive section of each one of the radio channel units with two of the plurality of antenna beams which, on average during said sampling period, have the strongest received signal strength of RF signal at the operating frequency of the one radio channel unit.

6. A scanning and targeting system according to claim 1, wherein each radio channel unit has a diversity receiver capable of receiving signals from two antenna beams and determining the signal having the strongest signal strength, and wherein said receiving means dynamically connects the receive section of each one of the radio channel units with two of the plurality of antenna beams which, on average during said sampling period, have the strongest received signal strength of RF signal at the operating frequency of the one radio channel unit.

7. A scanning and targeting system, comprising:

a plurality of radio channel units, each having a receive section and a transmit section;

a plurality of antenna beams;

means for interconnecting said plurality of radio channel units in a single trunk group with said plurality of antenna beams, said means for interconnecting including a receive modular interconnect matrix for dynamically connecting the receive section of each one of said radio channel units with any one of said antenna beams which, on average during a sampling period, has the strongest received signal strength of RF signals at an operating frequency of said one of said radio channel units, and wherein said receive modular interconnect matrix includes:

a plurality of frequency controllable receiver means, each associated with a corresponding group of radio channel units;

first switching means for selectively connecting each one of the antenna beams to each one of said frequency controllable receiver means; and control means for controlling said first switching means to selectively interconnect each one of the antenna beams with each one of said frequency controllable receiver means and for controlling said frequency controllable receiver means to provide signal strength measurements of RF signals received at the operating frequencies of the radio channel units in said corresponding group.

8. A scanning and targeting system according to claim 7 wherein said means for interconnecting further includes a transmit modular interconnect matrix for dynamically connecting the transmit section of each one of said radio channel units with any one of said antenna beams which, on average during said sampling period, is best suited for transmitting RF signals at the operating frequency of said one of said radio channel units in a direction corresponding to a desired destination for the transmitted RF signals.

9. A scanning and targeting system according to claim 8, wherein said receive modular interconnect matrix further includes second switching means for connecting the receive section of each one of said radio channel units with any one of said antenna beams, and wherein said control means controls said second switching means to connect the receive section of one of said radio channel units with the antenna beam indicated as having the strongest signal strength of RF signals received at the operating frequency of said one of said radio channel units.

10. A scanning and targeting system according to claim 9, wherein said transmit modular interconnect matrix includes third switching means for connecting the transmit section of each one of the radio channel units with any one of said antenna beams, and wherein said control means controls said third switching means to connect the transmit section of one of the radio channel units with the antenna beam indicated as having the strongest signal strength of RF signals received at the operating frequency of said one of said radio channel units.

11. A scanning and targeting system according to claim 10, wherein each radio channel unit has a diversity receiver capable of receiving signals from two antenna beams and determining the signal having the strongest signal strength, and wherein said control means controls said second switching means to dynamically connect the receive section of each one of said radio channel units with two of said antenna beams which, on average during said sampling period, have the strongest received signal strength of RF signal at the operating frequency of said one of said radio channel units.

12. A scanning and targeting system according to claim 11, wherein said plurality of frequency controllable receiver means includes:

a plurality of scanning receivers, each associated with a corresponding group of radio channel units; and a plurality of phase lock loops, each associated with one of said scanning receivers; and wherein said control means controls said phase lock loops to modulate said scanning receivers at the operating frequency of radio channel units in said corresponding group, and wherein said scanning receivers provide said control means with signal strength measurements of RF signals received at the operating frequencies of the radio channel units in said corresponding group.

13. A scanning and targeting system according to claim 8, wherein said transmit modular interconnect matrix includes third switching means for connecting the transmit section of each one of the radio channel units with any one of said antenna beams, and wherein said control means controls said third switching means to connect the transmit section of one of the radio channel units with the antenna beam indicated as having the strongest signal strength of RF signals received at the operating frequency of said one of said radio channel units.

14. A scanning and targeting system according to claim 7, wherein said receive modular interconnect matrix further includes second switching means for connecting the receive section of each one of said radio channel units with any one of said antenna beams, and wherein said control means controls said second switching means to connect the receive section of one of said radio channel units with the antenna beam indicated as having the strongest signal strength of RF signals received at the operating frequency of said one of said radio channel units.

15. A scanning and targeting system according to claim 14, wherein each radio channel unit has a diversity receiver capable of receiving signals from two antenna beams and determining the signal having the strongest signal strength, and wherein said control means controls said second switching means to dynamically connect the receive section of each one of said radio channel units with two of said antenna beams which, on average during said sampling period, have the strongest received signal strength of RF signal at the operating frequency of said one of said radio channel units.

16. A scanning and targeting system, comprising:

a plurality of radio channel units, each having a receive section and a transmit section;

a plurality of antenna beams; and means for interconnecting said plurality of radio channel units in a single trunk group with said plurality of antenna beams, said means for interconnecting including:

a receive modular interconnect matrix having:

a plurality of frequency controllable receiver means, each associated with a corresponding group of radio channel units;

first switching means for selectively connecting each one of the antenna beams to each one of said frequency controllable receiver means; and control means for controlling said first switching means to selectively interconnect each one of the antenna beams with each one of said frequency controllable receiver means and for controlling said frequency controllable receiver means to provide signal strength measurements of RF signals received at the operating frequencies of the radio channel units in said corresponding group; and a transmit modular interconnect matrix for dynamically connecting the transmit section of each one of said radio channel units with any one of said antenna beams which, on average during said sampling period, is best suited for transmitting RF signals at the operating frequency of said one of said radio channel units in a direction corresponding to a desired destination for the transmitted RF signals.

17. A scanning and targeting system according to claim 16, wherein said transmit modular interconnect matrix includes third switching means for connecting the transmit section of each one of the radio channel units with any one of said antenna beams, and wherein said control means controls said third switching means to connect the transmit section of one of the radio channel units with the antenna beam indicated as having the strongest signal strength of RF signals received at the operating frequency of said one of said radio channel units.

18. A scanning and targeting system according to claim 17, wherein said receive modular interconnect matrix further includes second switching means for connecting the receive section of each one of said radio channel units with any one of said antenna beams, and wherein said control means controls said second switching means to connect the receive section of one of said radio channel units with the antenna beam indicated as having the strongest signal strength of RF signals received at the operating frequency of said one of said radio channel units.

19. A scanning and targeting system according to claim 18, wherein each radio channel unit has a diversity receiver capable of receiving signals from two antenna beams and determining the signal having the strongest signal strength, and wherein said control means controls said second switching means to dynamically connect the receive section of each one of said radio channel units with two of said antenna beams which, on average during said sampling period, have the strongest received signal strength of RF signal at the operating frequency of said one of said radio channel units.

20. A land mobile radio base site having a plurality of radio channel units and a plurality of antenna beams, each radio channel unit having a receive section and a transmit section, the base site having a scanning and targeting system for interconnecting the transmit and receive sections of the radio channel units in a single trunk group with the antenna beams to exchange RF signals with remote mobile radios, the scanning and targeting system comprising:

at least one receive modular interconnect matrix, each receive modular interconnect matrix being associated with a corresponding group of radio channel units and dynamically connecting the receive section of each one of the radio channel units in said corresponding group with any one of the antenna beams which, on average during said sampling period, has the strongest received signal strength of RF signals at the operating frequency of said one of the radio channel units in said corresponding group, each receive modular interconnect matrix including:

a plurality of scanning receivers, each associated with a corresponding sub-group of radio channel units in said corresponding group of radio channel units;

first switching means for selectively connecting each one of the antenna beams to each one of said scanning receivers;

a plurality of phase lock loops, each associated with one of said scanning receivers; and control means for controlling said first switching means to selectively interconnect each one of the antenna beams with each one of said scanning receivers, for controlling said phase lock loops to modulate said scanning receivers at the operating frequency of radio channel units in said corresponding sub-group, and for receiving from said scanning receivers signal strength measurements of RF signals received at the operating frequencies of radio channel units in said corresponding sub-group.

21. A land mobile radio base site according to claim 20, further comprising at least one transmit modular interconnect matrix, each transmit modular interconnect matrix being associated with a corresponding receive modular interconnect matrix and dynamically connecting the transmit section of each one of the radio channel units in said corresponding group with any one of the antenna beams which, on average during said sampling period, is best suited for transmitting RF signals at the operating frequency of said one of the radio channel units in said corresponding group in a direction corresponding to the desired destination for the transmitted RF signals.

22. A land mobile radio base site according to claim 21, wherein said at least one receive modular interconnect matrix further comprises second switching means for connecting the receive section of each one of said radio channel units in said corresponding group of radio channel units with any one of said antenna beams, and wherein said control means controls said second switching means to connect the receive section of one of said radio channel units with the antenna beam indicated as having the strongest signal strength of RF signals received at the operating frequency of said one of said radio channel units.

23. A land mobile radio base site according to claim 22, wherein said at least one transmit modular interconnect matrix includes third switching means for connecting the transmit section of each one of the radio channel units in said corresponding group with any one of the antenna beams, and wherein said control means controls said third switching means to connect the transmit section of one of the radio channel units with the antenna beam indicated as having the strongest signal strength of RF signals received at the operating frequency of said one of the radio channel units.

24. A land mobile radio base site according to claim 23, wherein each radio channel unit has a diversity receiver capable of receiving signals from two antenna beams and determining the signal having the strongest signal strength, and wherein said control means controls said second switching means to dynamically connect the receive section of each one of said radio channel units with two of the antenna beams which, on average during said sampling period, have the strongest received signal strength of RF signal at the operating frequency of said one of the radio channel units.

\* \* \* \* \*

UNITED STATES PATENT AND TRADEMARK OFFICE
CERTIFICATE OF CORRECTION

PATENT NO : 6,006,113
DATED : December 21, 1999
INVENTOR(S) : Sheldon Kent Meredith It is certified that error appears in the above-identified patent and that said Letters Patent is hereby corrected as shown below:

At column 15, line 42, (claim 5, line 2) delete "receive" and insert --receiver--.

Signed and Sealed this

Twenty-sixth Day of December, 2000

Attest:

Q. TODD DICKINSON

Attesting Officer

Director of Patents and Trademarks